Patented July 4, 1933

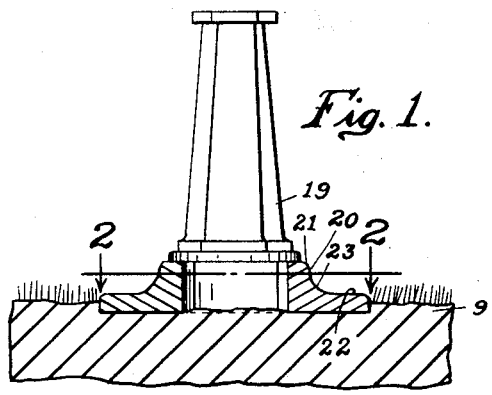
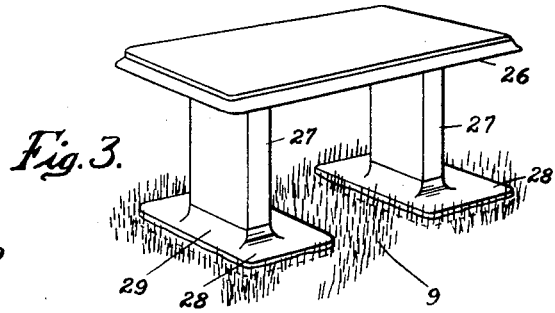
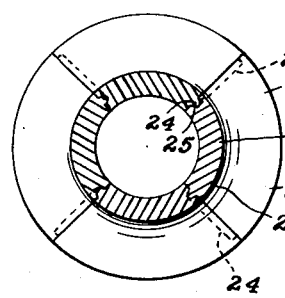
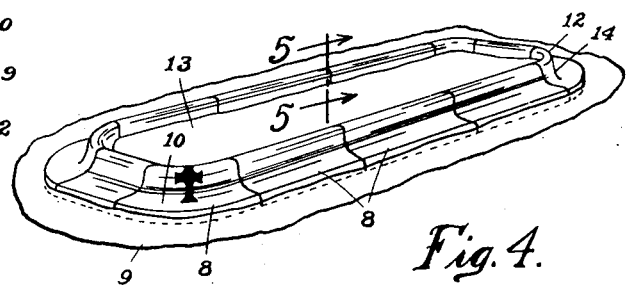
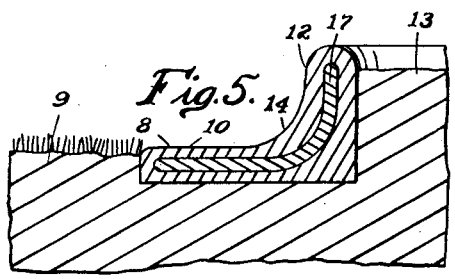
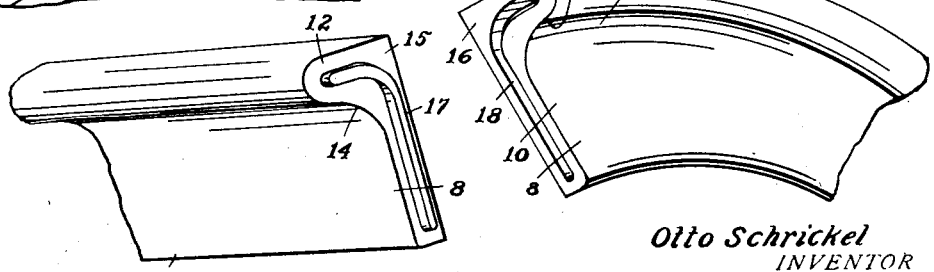

1,916,494

UNITED STATES PATENT OFFICE

OTTO SCHRICKEL, OF MOUNT HEALTHY, OHIO

MOWER GUIDE FOR LAWN FIXTURES

Application filed June 20, 1932. Serial No. 618,229.

This invention relates to a mower guide for lawn fixtures and the like, such as lawn benches, flower bed, grave and lawn edgings, statuary and other decorative fixtures used in landscaping.

An object of the invention is to provide means of a simple beauty enhancing nature, whereby graves, garden beds and other lawn decorating fixtures may be enclosed or separated from the grass of a lawn, said means being adapted to provide a supporting ledge for a lawn mower wheel so that the grass may be kept in a properly cut condition without requiring a subsequent hand trimming operation around such garden beds or lawn fixtures.

Another object is to provide an edging or confining means of the above stated character, which includes a series of interlocking members so related to one another as to effectually retain the ground, mulch, fertilizer and water of an enclosure and preclude the growth of vegetation therebetween; the interlocks serving also to prevent displacement of the individual interlocked members when a lawn mower is moved thereover.

Another object is to provide an enclosure edging means having horizontal and substantially vertical walls, with an intermediate riser portion or fillets of a determined curvature such as will preclude a mower wheel from climbing atop the vertical wall and precluding also sideswiping of the mower wheel or its axle end against the vertical wall and thereby defacing it.

Another object is to provide a landscape fixture with a means, such as is above set forth, for guiding a lawn mower wheel in the manner described.

These and other objects are attained by the means described herein and disclosed in the accompanying drawing, in which:

Fig. 1 is a view, partly in cross section, showing a pedestal or the like provided with the mower wheel guide means of the invention.

Fig. 2 is a cross sectional view taken on line 2—2 of Fig. 1.

Fig. 3 shows another lawn fixture in the form of a bench embodying the invention.

Fig. 4 is a plan view of a grave enclosure, a flower or garden bed or other enclosure, edged in accordance with the present invention.

Fig. 5 is a cross sectional view taken on line 5—5 of Fig. 4.

Figs. 6 and 7 show complementary edging elements of the invention in separated relationship.

Although it has been common practice to provide flower beds, gardens, and the like with edging means for separating such enclosures from the grass of a lawn, such means have never proven entirely satisfactory because of the difficulty encountered in cutting the grass of the lawn which was bordered by said edge means. The use of edging members constituted of ordinary blocks or the like has always required a separate trimming operation, usually by hand, on the grass that grew closely adjacent to the block or edge members. One of the objects of the present invention is to provide means whereby this hand trimming operation is eliminated, it being possible to quickly and neatly cut the grass of a lawn close to the edging members without requiring a separate trimming operation.

The invention consists in providing a series of mower guide members of block-like formation, such as is shown in Figs. 4, 6, and 7. Each mower guide member comprises a horizontal flange portion 8 which is wide enough to form a secure base for said members and also accommodate the wheel and a portion of the blade of a lawn mower, these flanges being adapted to seat in the earth 9 with the top surface 10 thereof substantially flush with the surface of the earth. At substantially right angles to the horizontal flange portion 10 is a substantially vertical wall 12, which is adapted to confine a portion of the earth 13 that is elevated above the surface 9. Intermediate the horizontal and vertical walls is a fillet or riser portion 14 which is of a computed curvature such that it will prevent a lawn mower wheel from climbing over the vertical wall 12, while at the same time it prevents the side of the wheel or its axle end from contacting the vertical wall and thereby defacing it. To the best of my knowledge, edging blocks heretofore have not been constructed so as to prevent the side of the wheel or its axle end from moving very close to, and capable of contacting with, the vertical wall of the edging member.

It is to be observed that the contacting ends 15 and 16 of the complementary lawn mower guides are provided with light excluder and lock means, which may be in the form of tongue and groove elements 17 and 18, respectively, which extend substantially the full depth of both the horizontal and the vertical walls. These light excluders are made continuous, so that it is impossible for vegetation to grow through the edging members and make an unsightly appearance. The continuity and slope of the light excluder is important also in that it provides a predetermined path whereby rain and sprinkling water may be directed along substantially the entire length of the crack between the guide members, for the purpose of keeping the crack clear of dirt and undesirable growths. This construction of lawn mower guide also insures retention of ground, mulch, fertilizer and water within the confines of the flower bed formation. It will readily be understood that each lawn mower guide 8 has a tongue at one end and a groove at the other end, as is clearly indicated in Fig. 4. The tongue and groove construction obviously will serve the additional purpose of precluding relative displacement of the guide members which might otherwise result from running of a lawn mower thereover. It is to be noted that displacement is precluded also by the fact that the mower guide members are adapted to receive support from the earth at both the front and rear thereof, thus providing a double lock for resisting relative displacement.

In Fig. 1 is shown a pedestal, which may provide a standard for a bird bath, fish bowl, sun dial, or other lawn decorating fixture, which embodies the means of the invention. As is clearly illustrated, the pedestal 19 is surrounded by a series of lawn mower guide members 20 substantially arcuate in formation, in which the vertical wall 21 is separated from the horizontal base portion 22 by a fillet or riser portion 23 of the proper curvature necessary to prevent the climbing tendency of a lawn mower wheel and any possibility of the side of the wheel or its axle end to scratch or mar the vertical wall 20. It is to be observed that the horizontal base portion 22 is wide enough (not less than four or five inches) to accommodate the wheel and part of the blade of a lawn mower, and the top surface thereof is disposed substantially level with or slightly above the level of the earth adjacent thereto. Like the lawn mower guide members of Figs. 6 and 7, the members 20 are provided with interlocking tongue and groove formations 24 and 25, respectively. In Fig. 3 the invention is shown embodied in a lawn bench 26 which comprises standards 27 having at their lower ends the lawn mower guides 28 characterized by the type of base, vertical wall and fillet heretofore described. When running a lawn mower wheel over the bases 28, it is impossible to scratch or mar any portion of the standards 27 because of the predetermined arcuate formation of the fillet or riser portion 29 which prevents the climbing and side-swiping tendency of a lawn mower wheel.

Many cemeteries have for years prohibited the installation of grave copings because of the difficulty and labor involved in trimming around the copings. By installing the devices of this invention, however, graves may be kept in a properly trimmed condition with even less labor than is required for the proper upkeep of graves not having a coping around them.

What is claimed is:

1. A lawn mower guide structure for lawn edging purposes constituted of a series of interlocking members each of which comprises a substantially flat horizontal wall of sufficient width to accommodate a wheel and a portion of the cutting elements of a lawn mower, a substantially vertical retaining wall for confining earth, mulch and water within an enclosure bounded by said interlocking members and a light excluder for vegetation constituted of interlocking flange members extending substantially the full depth of the horizontal wall and substantially the full height of the vertical wall, said light excluder flanges being connected together along their full length to provide a continuous barrier to the growth of vegetation.

2. A lawn mower guide structure for lawn edging purposes constituted of a series of interlocking members each of which comprises a substantially flat horizontal wall of sufficient width to accommodate a wheel and a portion of the cutting elements of a lawn mower, a substantially vertical retaining wall for confining earth, mulch and water within an enclosure bounded by said interlocking members and a light excluder for vegetation constituted of interlocking flange members extending substantially the full depth of the horizontal wall and substantially the full height of the vertical wall, said light excluder flanges being connected together along their full length to provide a continuous barrier to the growth of vegetation, and a riser portion in the nature of a concave fillet intermediate said walls shaped to preclude climbing of a lawn mower wheel atop the vertical wall and to maintain the wheel side and its axle end in spaced relation to the vertical wall for precluding defacing of said wall thereby.

In testimony whereof, I have hereunto subscribed my name this 17th day of June, 1932.

OTTO SCHRICKEL.